(12) United States Patent
Shirasuna et al.

(10) Patent No.: US 11,713,091 B2
(45) Date of Patent: Aug. 1, 2023

(54) STRADDLE TYPE ELECTRIC VEHICLE (71) Applicant: HONDA MOTOR CO., LTD., Tokyo (JP)

(72) Inventors: Takamori Shirasuna, Wako (JP); Makoto Fujikubo, Wako (JP); Kazuya Atsumi, Wako (JP); Yoshihiro Nomura, Wako (JP); Yoshimi Numazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 17/016,306

(22) Filed: Sep. 9, 2020

(65) Prior Publication Data

US 2020/0407005 A1    Dec. 31, 2020

Related U.S. Application Data

(63) Continuation of application No. PCT/JP2018/013428, filed on Mar. 29, 2018.

(51) Int. Cl.
*B62K 11/04*      (2006.01)
*B62J 43/00*      (2020.01)
*B62K 25/28*      (2006.01)

(52) U.S. Cl.
CPC .............. *B62K 11/04* (2013.01); *B62J 43/00* (2020.02); *B60Y 2200/12* (2013.01); *B62K 25/283* (2013.01); *B62K 2204/00* (2013.01)

(58) Field of Classification Search
CPC ...... B62K 2204/00; B62K 11/04; B62J 43/00; B60Y 2200/12

USPC ........................................................ 180/220
See application file for complete search history.

(56) References Cited

U.S. PATENT DOCUMENTS

| | | | |
|---|---|---|---|
| 5,501,292 A | 3/1996 | Kawashima et al. | |
| 5,657,830 A | 8/1997 | Kawashima et al. | |
| 7,267,190 B2 * | 9/2007 | Hirano ................... | B62K 19/46 180/68.5 |
| 8,418,795 B2 * | 4/2013 | Sasage ................... | B62K 11/10 180/220 |
| 8,485,300 B2 * | 7/2013 | Hasegawa .............. | B62K 11/04 180/220 |

(Continued)

FOREIGN PATENT DOCUMENTS

CN      102556239 A      7/2012
CN      103237717 A      8/2013

(Continued)

OTHER PUBLICATIONS

Indian Office Action for Indian Patent Application No. 202047038713 dated Apr. 15, 2021.

(Continued)

*Primary Examiner* — Minnah L Seoh
*Assistant Examiner* — Myles A Harris
(74) *Attorney, Agent, or Firm* — Thomas | Horstemeyer, LLP (57) ABSTRACT

A straddle type electric vehicle comprises a main frame, a motor unit including an electric motor, a battery that supplies power to the motor unit, and a control unit that executes drive control of the motor unit. The main frame includes a left and right pair of portions, and at least a portion of the motor unit is disposed at a position overlapping the main frame in a side view of the vehicle.

10 Claims, 7 Drawing Sheets

(56) References Cited

U.S. PATENT DOCUMENTS

| | | | | |
|---|---|---|---|---|
| 8,547,218 B2 * | 10/2013 | Tamaki | ........... | B60Q 5/008 340/474 |
| 8,672,077 B2 * | 3/2014 | Sand | ........... | B62K 25/00 180/220 |
| 8,783,405 B2 | 7/2014 | Irie et al. | | |
| 8,833,495 B2 | 9/2014 | Iwata et al. | | |
| 8,960,355 B2 | 2/2015 | Matsuda | | |
| 8,970,356 B2 * | 3/2015 | Tamaki | ........... | B60L 50/64 361/679.01 |
| 8,973,689 B2 * | 3/2015 | Plazotta | ........... | B62J 43/28 180/231 |
| 9,027,694 B2 * | 5/2015 | Matsuda | ........... | B62J 43/16 180/220 |
| 9,067,615 B2 * | 6/2015 | Kashiwai | ........... | B62K 25/283 |
| 9,160,214 B2 | 10/2015 | Matsuda | | |
| 9,278,725 B2 | 3/2016 | Matsuda | | |
| 9,290,226 B2 | 3/2016 | Nitta | | |
| 9,302,734 B2 * | 4/2016 | Getta | ........... | B62M 11/14 |
| 9,308,957 B2 | 4/2016 | Matsuda | | |
| 9,643,514 B2 * | 5/2017 | Matsuda | ........... | B60L 50/51 |
| 9,956,883 B2 * | 5/2018 | Kawabata | ........... | B62J 43/16 |
| 10,011,323 B2 * | 7/2018 | Inoue | ........... | B60L 50/66 |
| 10,723,401 B2 * | 7/2020 | Matsushima | ........... | B62J 1/08 |
| 11,007,882 B2 * | 5/2021 | Matsushima | ........... | B60L 50/50 |
| 11,097,609 B2 * | 8/2021 | Matsuda | ........... | B60L 50/16 |
| 2006/0040161 A1 * | 2/2006 | Horii | ........... | B62M 7/02 429/512 |
| 2010/0018787 A1 * | 1/2010 | Plazotta | ........... | B60L 50/66 180/65.6 |
| 2012/0000720 A1 * | 1/2012 | Honda | ........... | B62K 11/10 180/65.1 |
| 2012/0000724 A1 * | 1/2012 | Mimura | ........... | B62M 7/12 180/291 |
| 2012/0097463 A1 | 4/2012 | Iwata et al. | | |
| 2012/0111651 A1 * | 5/2012 | Irie | ........... | B62K 11/04 180/65.1 |
| 2013/0229072 A1 * | 9/2013 | Matsuda | ........... | H02K 9/19 310/53 |
| 2013/0234505 A1 * | 9/2013 | Matsuda | ........... | B60L 15/007 307/9.1 |
| 2013/0270023 A1 * | 10/2013 | Matsuda | ........... | B62K 11/04 180/220 |
| 2013/0270025 A1 | 10/2013 | Matsuda | | |
| 2013/0270038 A1 | 10/2013 | Nitta | | |
| 2013/0270938 A1 | 10/2013 | Matsuda | | |
| 2013/0277133 A1 | 10/2013 | Matsuda | | |
| 2013/0292198 A1 * | 11/2013 | Matsuda | ........... | B62K 11/02 180/220 |
| 2014/0353062 A1 * | 12/2014 | Bock | ........... | B62K 11/00 310/59 |
| 2015/0122569 A1 * | 5/2015 | Miyashiro | ........... | B62K 11/04 180/220 |
| 2015/0375596 A1 * | 12/2015 | Blain | ........... | B60K 1/04 165/47 |
| 2016/0347199 A1 * | 12/2016 | Mochizuki | ........... | B62K 25/283 |
| 2021/0001943 A1 * | 1/2021 | Ikeda | ........... | B62J 1/08 |
| 2021/0001953 A1 * | 1/2021 | Shirasuna | ........... | B62J 45/00 |
| 2022/0177070 A1 * | 6/2022 | Reitinger | ........... | B62J 25/06 |

FOREIGN PATENT DOCUMENTS

| | | | | |
|---|---|---|---|---|
| EP | 2873599 A1 * | 5/2015 | ........... | B60K 1/04 |
| EP | 3301002 A1 * | 4/2018 | ........... | B60L 11/1896 |
| JP | H04151389 A | 5/1992 | | |
| JP | H0746620 Y2 * | 10/1995 | | |
| JP | 3050422 B2 * | 6/2000 | | |
| JP | 2011031646 A | 2/2011 | | |
| JP | 2012101679 A | 5/2012 | | |
| JP | 2013071710 A | 4/2013 | | |
| WO | 2012063291 A1 | 5/2012 | | |
| WO | 2012090245 A1 | 7/2012 | | |
| WO | 2012090463 A1 | 7/2012 | | |
| WO | WO-2012090243 A1 * | 7/2012 | ........... | B62K 11/02 |
| WO | 2019186953 A1 | 10/2019 | | |
| WO | WO-2019186943 A1 * | 10/2019 | | |
| WO | WO-2019186954 A1 * | 10/2019 | | |
| WO | WO-2020012791 A1 * | 1/2020 | | |

OTHER PUBLICATIONS

International Search Report for PCT/JP2018/013428 dated Jun. 19, 2018.
IPRP for PCT/JP2018/013428 dated Feb. 7, 2020.
Chinese Office Action for Chinese Patent Application No. 201880091279.5 dated Jun. 17, 2021.

* cited by examiner

STRADDLE TYPE ELECTRIC VEHICLE

CROSS-REFERENCE TO RELATED APPLICATION(S)

This application is a continuation of International Patent Application No. PCT/JP2018/013428 filed on Mar. 29, 2018, the entire disclosures of which is incorporated herein by reference.

BACKGROUND OF THE INVENTION

Field of the Invention

The present invention relates to a straddle type electric vehicle.

Description of the Related Art

A known straddle type electric vehicle using an electric motor as the drive power source includes a straddle type electric vehicle installed with a battery that supplies power to an electric motor and control unit that controls the power supplied from the battery to the electric motor (for example. International Publication No. 2012/063291).

SUMMARY OF THE INVENTION

In a straddle type electric vehicle in which power is supplied from a battery to an electric motor, cruising distance depends on the capacity of the battery. Thus, ensuring space for housing a larger battery is desirable.

An embodiment of the present invention provides a straddle type electric vehicle in which more housing space for a battery can be ensured.

According to an embodiment of the present invention, a straddle type electric vehicle comprises, a front wheel and a rear wheel; a head pipe that supports a steering mechanism for steering the front wheel; a main frame connected to the head pipe that extends in a vehicle longitudinal direction; a motor unit including an electric motor that outputs a driving force to rotate the rear wheel; a battery that supplies power to the motor unit; and a control unit that executes drive control of the motor unit, wherein the motor unit and the battery are supported by the main frame between the front wheel and the rear wheel; the main frame includes a left and right pair of portions; the left and right pair of portions include a left and right pair of pivot frames extending in a vertical direction; and at least a portion of the motor unit and at least a portion of the control unit are disposed at a position overlapping the pivot frames frame in a side view of the vehicle.

Further features of the present invention will become apparent from the following description of exemplary embodiments (with reference to the attached drawings).

DESCRIPTION OF THE EMBODIMENTS

A straddle type vehicle according to an embodiment of the present invention will be described with reference to the drawings. In the drawings, arrows X, Y, and Z indicate directions orthogonal to one another, with the X direction indicating the front-and-rear direction of the straddle type vehicle, the Y direction indicating the vehicle width direction (lateral direction) of the straddle type vehicle, and the Z direction indicating the vertical direction. Hereinafter, the front and rear of the front-and-rear direction of the straddle type vehicle may be simply referred to as "front" and "rear", and the inner side and outer side in the vehicle width direction (lateral direction) of the straddle type vehicle may be simply referred to as "inner side" and "outer side". Also, when describing a left and right pair of components, one of the left and right pair may be not illustrated or the description thereof may be omitted.

Summary of the Straddle Type Vehicle

Figure 1:
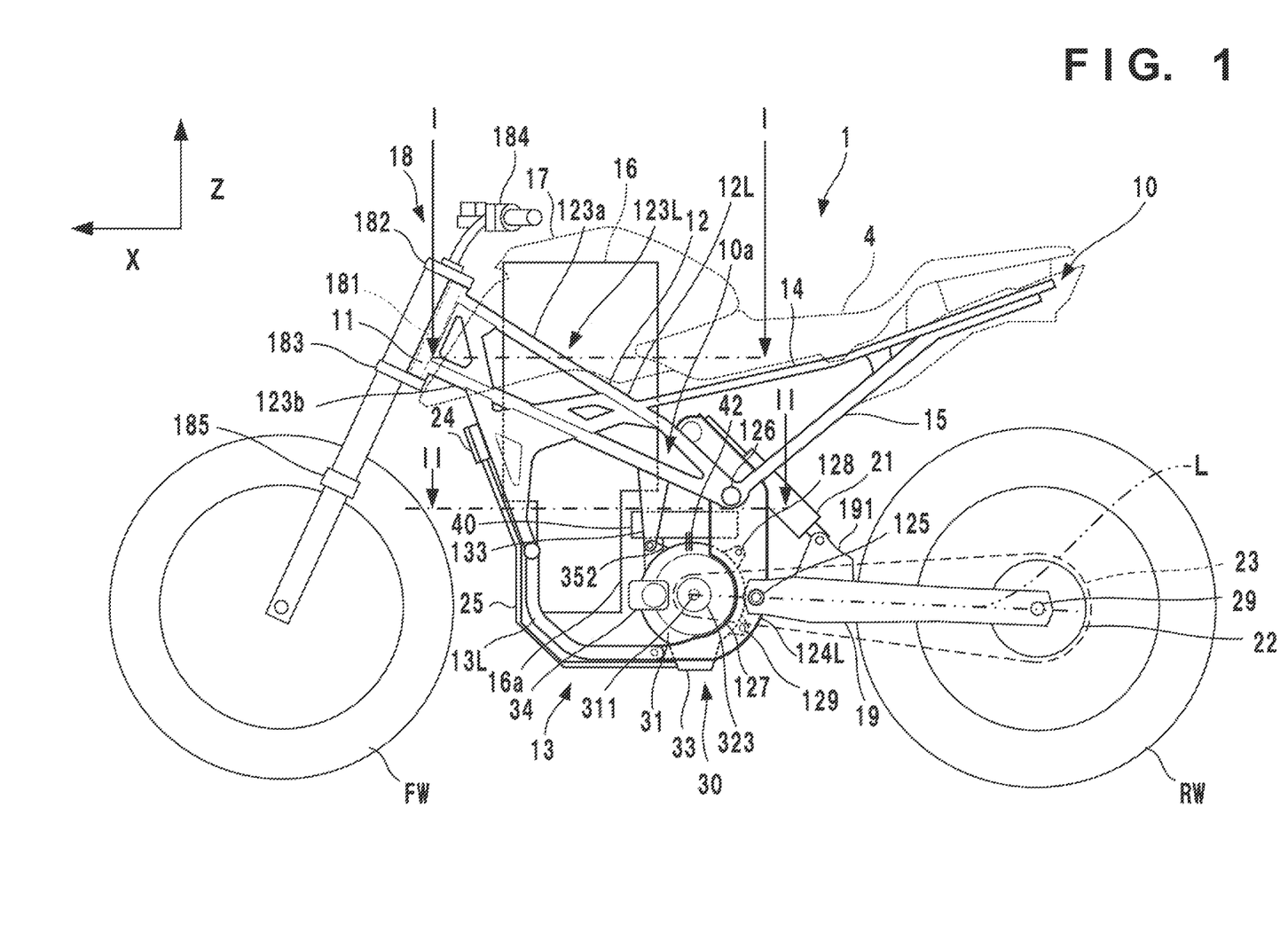
FIG. 1 is a left side view of a straddle type electric vehicle according to an embodiment.

FIG. 1 is a left side view of a straddle type electric vehicle 1 according to an embodiment of the present invention. The same drawing is a schematic view with a main portion of the straddle type electric vehicle 1 centered. Hereinafter, the straddle type electric vehicle 1 may be referred to as the vehicle 1.

The vehicle 1 is provided with a vehicle body frame 10 that includes a head pipe 11 provided in a vehicle front portion; a main frame 12 connected to the head pipe 11 and extending in the front-and-rear direction; a down frame 13 extending in the front-and-rear direction downward from the main frame 12, and a seat frame 14 extending rearward from the main frame 12. Also, the main frames 12 are connected at rear end portions thereof and the down frames 13 are connected at rear end portions thereof.

Figure 2:
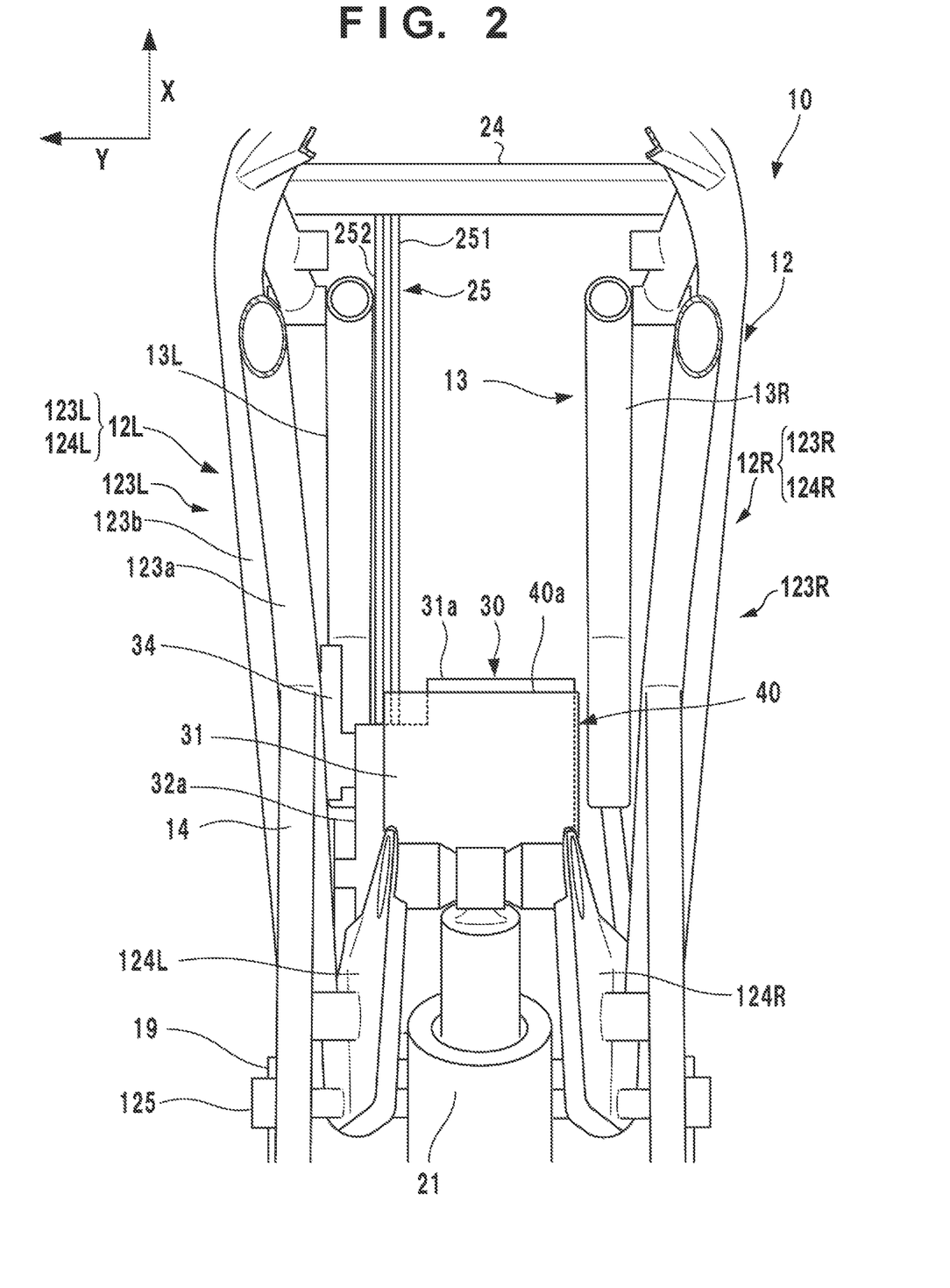
FIG. 2 is a cross-sectional view taken along line I-I of FIG. 1 with some components omitted.

Next, FIG. 2 as well as FIG. 1 will be referenced. FIG. 2 is a cross-sectional view taken along line I-I of FIG. 1 with some components omitted. The main frame 12 of the present embodiment includes a main frame 12L extending on the left side of the vehicle 1 from the head pipe 11 and a main frame 12R extending on the right side of the vehicle 1 from the head pipe 11. The frames are formed separated in the vehicle width direction (on the left and right). The main frames 12L, 12R include a left and right pair of backbone frames 123L, 123R and a left and right pair of pivot frames 124L, 124R. Hereinafter, the left and right pair of backbone frames 123L. 123R may be simply referred to as the backbone frame 123, and the left and right pair of pivot frames 124L, 124R may be simply referred to as the pivot frame 124 (Hereinafter, provided left and right pairs may be treated the same). The backbone frame 123 of the present embodiment includes an upper portion 123a extending from an upper portion of the head pipe 11 rearwardly downward with respect to the vehicle and a lower portion 123b extending from a lower portion of the head pipe 11 rearwardly downward with respect to the vehicle. The upper portion 123a and the lower portion 123b are connected at a rear end portion 126 of the backbone frame 123 or connected at a midway portion. With this configuration, weight reduction can be achieved and the rigidity of the main frame 12 can be increased.

Note that in the present embodiment, the main frame 12 is divided to the left and right from the head pipe 11 and extends rearwardly downward with respect to the vehicle, forming the main frames 12L and 12R along the entire region of the main frame 12. However, other configurations may be employed, including configurations in which a single frame portion extends rearward from the head pipe 11 and branches to the left and right and configurations in which the frame portion does not branch. Also, the backbone frame 123 in the present embodiment includes the upper portion 123a extending rearward from an upper portion of the head pipe 11 and the lower portion 123b extending rearward from a lower portion, both divided to the left and right. However, a configuration may be employed in which a single portion on the left and right extends rearward from the head pipe 11.

The left and right pair of pivot frames 124 are formed extending vertically from the rear end portions 126 of the backbone frames 123, and upper portions of the left and right pair of pivot frames 124 support a rear suspension 21. Also, the pivot frames 124 include a pivot shaft 125 that supports a rear swing arm 19, described below, downward from the rear end portions 126 of the backbone frame 123. Furthermore, the pivot frame 124 at the lower end is connected to the rear end of the down frame 13. Note that the backbone frame 123 and the pivot frame 124 may be integrally formed or may be separate members joined via metallurgical bonding such as welding, mechanical joining such as bolt fastening, or the like.

A left and right pair of down frames 13L, 13R are provided extending in the vehicle longitudinal direction downward from the main frame 12. The down frame 13 extends from a lower portion of the main frame downward to a lower end, extends from the lower end rearward, and connects to a lower end of the pivot frame 124.

In the present embodiment, the down frame 13 extends downward from a lower portion of the main frame 12. However, a configuration may be employed in which the down frame 13 extends downward from the head pipe 11. Also, the down frame 13 is formed divided into the down frame 13L and the down frame 13R along the entire region of the down frame 13. However, a configuration may be employed in which a single frame extends downward from the head pipe 11 or the main frame 12 and then branches to the left and right.

The left and right pair of seat frames 14 are provided extending rearward from the main frame 12 and support a seat 4. Also, a sub-frame 15 is provided, downward from the left and right pair of seat frames 14, for connecting the main frame 12 and the left and right pair of seat frames 14.

The head pipe 11 supports a steering mechanism 18 for steering a front wheel FW. The steering mechanism 18 includes a steering stem 181 is turnably supported on the head pipe 11, and a top bridge 182 is attached to an upper end portion of the steering mechanism 18 and a bottom bridge 183 is attached to a lower end portion of the steering mechanism 18. The top bridge 182 is provided with a handle 184 for a driver to steer the front wheel FW. A left and right pair of front forks 185 are supported by the top bridge 182 and the bottom bridge 183. The front forks 185 extend frontwardly downward with respect to the vehicle, and the front wheel is rotatably supported on lower ends thereof.

The rear swing arm 19, at a front end portion, is swingably supported by a pivot shaft 125 provided in the pivot frames 124. At a rear end portion of the rear swing arm 19, a rear wheel RW is rotatably supported, and the rear wheel RW is rotationally driven by a chain 23 wound around a drive sprocket 323 of a motor unit 30 and a driven sprocket 22 of the rear wheel RW. The rear swing arm 19 includes, at an upper portion thereof, a support portion 191 that supports the rear suspension 21, and swing here is dampened by the rear suspension 21.

Figure 4:
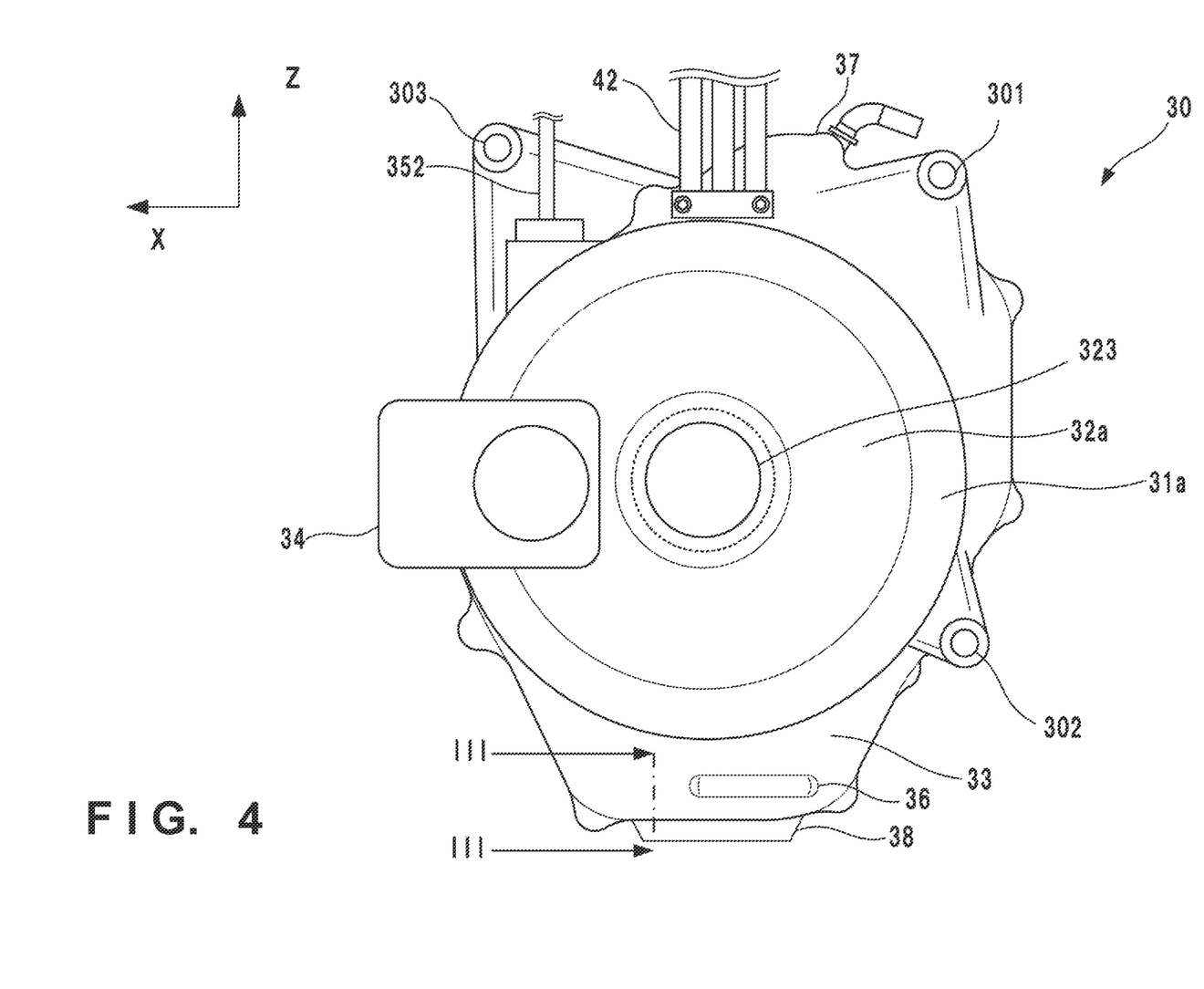
FIG. 4 is a front view schematically illustrating a motor unit according to an embodiment.
Figure 5:
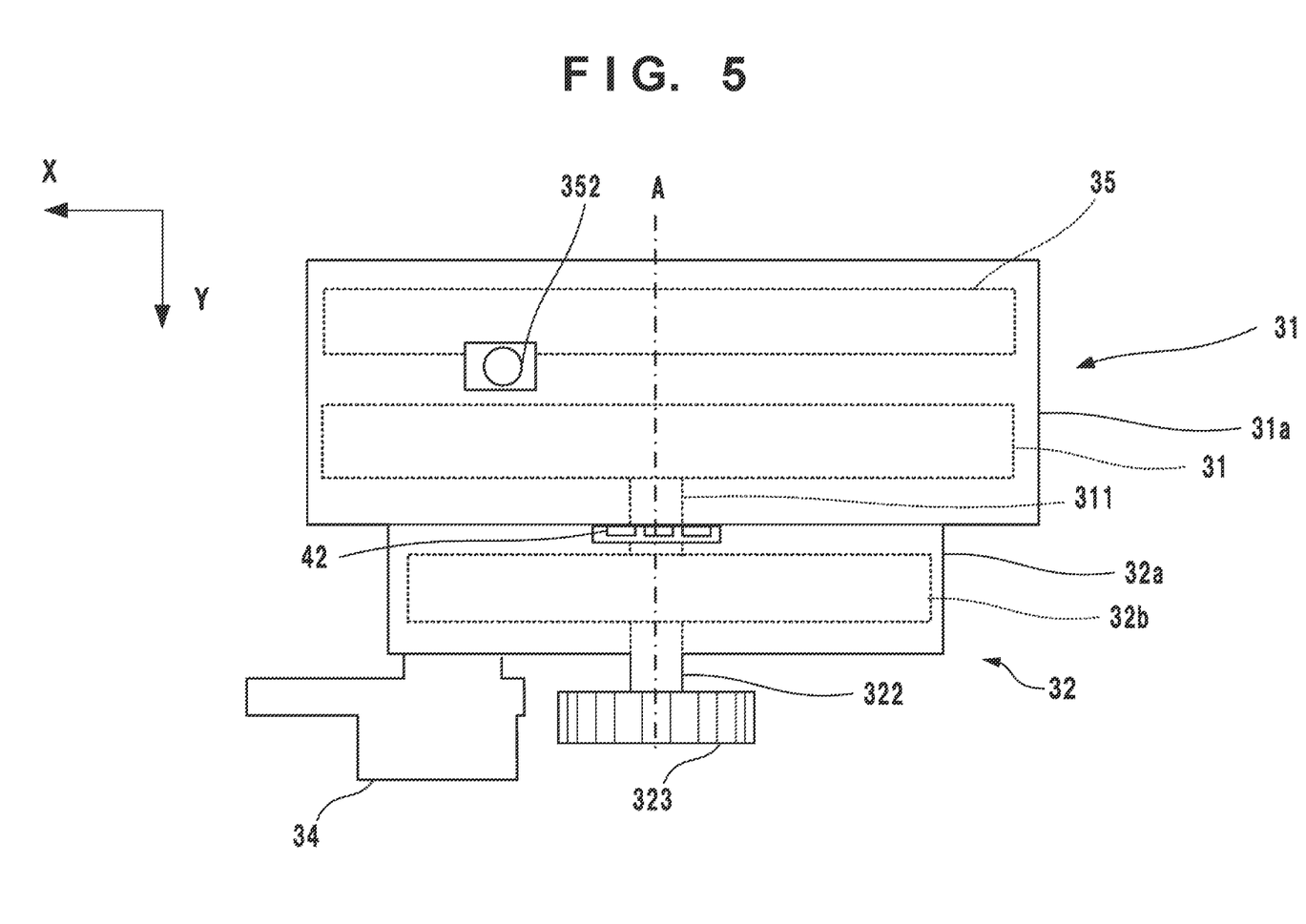
FIG. 5 is atop view of the motor unit of FIG. 4 schematically illustrating an inner portion.

FIGS. 4 and 5 as well as FIGS. 1 and 2 will be referenced. FIG. 4 is a front view schematically illustrating the motor unit 30. FIG. 5 is a top view schematically illustrating an inner portion of the motor unit 30. The motor unit 30 includes an electric motor 31 that outputs a driving force to rotate the drive sprocket 323. Also, the electric motor 31 is housed in a motor housing portion 31a. In the present embodiment, the axial direction of a motor shaft 311 of the electric motor and the vehicle width direction are aligned, and the motor unit 30 is disposed with the front surface facing to the left.

Also, the motor unit 30 includes a deceleration portion 32 for decelerating the driving force for rotating the electric motor 31. The deceleration portion 32 includes a case portion 32a that projects outward from the motor housing portion 31a in the vehicle width direction, a reduction gear 32b for decelerating the rotation of the motor shaft 311, and an output shaft 322 for outputting a rotational driving force after deceleration via the reduction gear.

In the present embodiment, the reduction gear 32b is a planetary gear mechanism including a planetary gear, and the motor shaft 311 and the output shaft 322 are coaxially disposed (on the axis line A of FIG. 5). The drive sprocket 323 is attached to the output shaft 322 of the deceleration portion 32.

Figure 6:
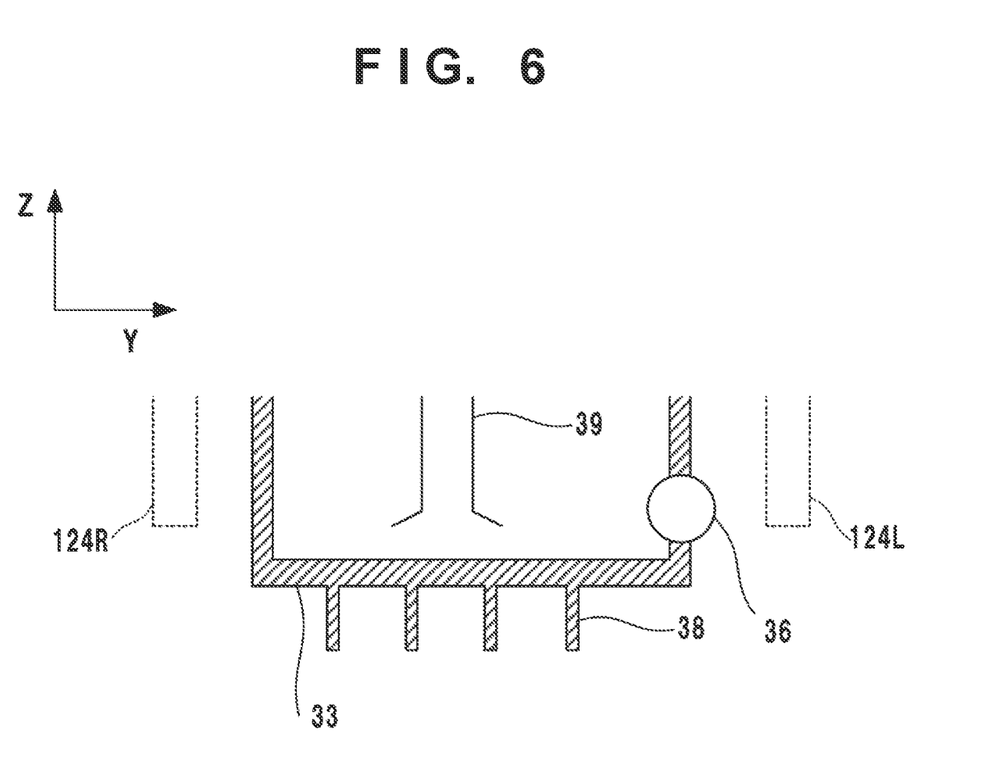
FIG. 6 is a cross-sectional view taken along line III-III of FIG. 4.

An oil pan 33 is formed on a bottom portion of the motor unit 30. Oil collected in the oil pan 33 is taken in by an oil pump 34 and discharged to lubricate and cool the inner portion of the motor unit 30. The oil supplied to the inner portions of the motor unit 30 is returned to the oil pan 33 via the oil dropping naturally or the like. Next, FIG. 6 will also be referenced. FIG. 6 is a cross-sectional view taken along line III-III of FIG. 4. The inner portion of the oil pan 33 is provided with a strainer 39. The strainer 39 filters the oil collected inside the oil pan 33 when the oil is taken up by the oil pump 34.

The motor unit 30 includes, on an upper portion thereof and a side surface opposite the side where the deceleration portion 32 is disposed, a breather chamber 37 for connecting the motor unit 30 to the outside and for gas-liquid separation. Also, the motor unit 30 includes an oil filter 36 that removes impurities in the oil circulating in the motor unit 30.

A battery 16 stores power that is supplied to the motor unit 30. A control unit 40 executes, in accordance with an acceleration operation and the like by the driver, control (drive control) of the supply of power, with the battery 16 as a power source, to the motor unit 30, and in particular to the electric motor 31. The motor unit 30 and the control unit 40 are connected by bus bar 42, which is an electric connection member, and power is supplied from the control unit 40 to the motor unit 30 via the bus bar 42. In the present embodiment, a bus bar is used as the electric connection member. However, another type of connection member, such as a flexible harness, capable of transferring electric signals may be employed. Also, the motor unit 30 and the control unit 40 generate heat when driven. However, a heat exchanger 24 and a circulating cooling medium cools the motor unit 30 and the control unit 40, helping to prevent the motor unit 30 and the control unit 40 reaching a high temperature.

Arrangement Configuration of the Motor Unit and the Control Unit

Figure 3:
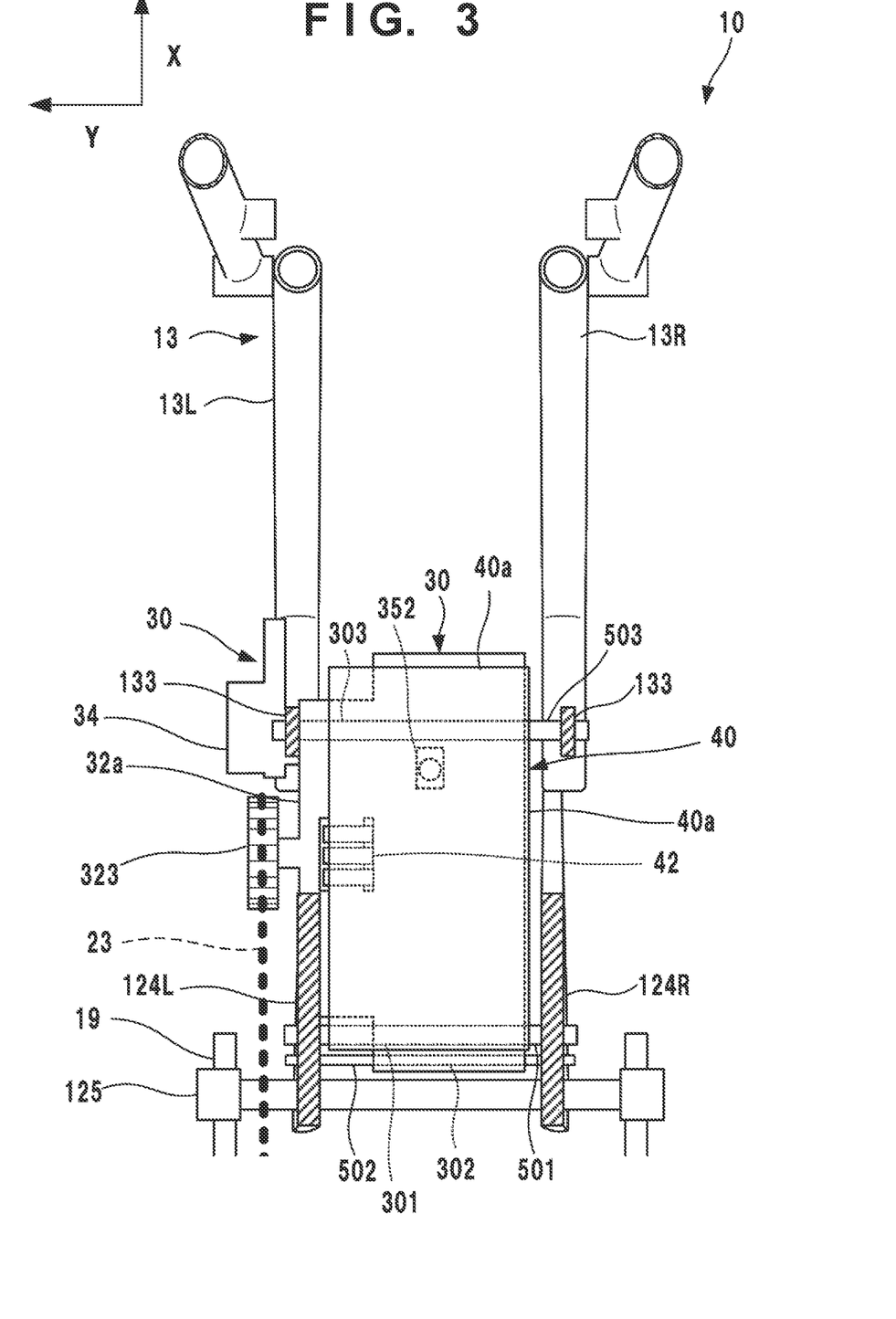
FIG. 3 is a cross-sectional view taken along line II-II of FIG. 1 with some components omitted.

Next, FIGS. 1 to 3 will be referenced. FIG. 3 is a cross-sectional view taken along line II-II of FIG. 1 with some components omitted.

In the present embodiment, a housing portion 10*a* of the battery 16, the motor unit 30, and the control unit 40 is mainly defined by the main frames 12 and the down frames 13. In the present embodiment, the housing portion 10*a* on the left side in the vehicle width direction is defined by the head pipe 11, the main frame 12L, and down frame 13L connected in a loop-like shape, and the housing portion 10*a* on the right side in the vehicle width direction is defined in a similar manner by the head pipe 11, the main frame 12R, and the down frame 13R connected in a loop-like shape. With this loop-shaped frame, the protection performance of the sides of the battery 16, the motor unit 30, and the control unit 40 can be increased. The lower limit of the housing portion 10*a* in the vertical direction is defined by the down frames 13, and on the upper side, with the vehicle body frame 10 being open, the housing portion 10*a* is defined by a cover member 17.

Also, inside the housing portion 10*a*, the battery 16, the motor unit 30, and the control unit 40 are housed. The battery 16 is disposed, as viewed in a top view of the vehicle, between the backbone frames 123L, 123R, and is supported by the backbone frames 123L, 123R via a non-illustrated fixing structure. Also, only the battery 16 is disposed projecting higher than the backbone frames 123 and covered by the cover member 17. Because the battery 16 projects higher than the backbone frames 123, a larger battery can be installed.

In the present embodiment, the following structure for the housing portion 10*a* is employed to create more housing space for the battery 16. In other words, in the present embodiment, the motor unit 30, in a side view of the vehicle, is disposed overlapping the main frame 12. Thus, the space between the main frames 12 in the housing portion 10*a* can be used as space to dispose the motor unit 30 in, allowing the remaining space to be used as battery housing space. Thus, according to the configuration of the present embodiment, the motor unit 30 is disposed overlapping the pivot frame 124 in the vehicle width direction. In this way, the motor unit 30 is disposed inside the housing portion 10*a* to the rear side. This can create more housing space for the battery 16 in space on the front side of the housing portion 10*a*.

Here, the battery 16 includes a surface 16*a* that faces the front side of the motor unit 30. According to the configuration described above, the shape of the battery 16 can be determined with the surface 16*a* located further rearward. As a result, the battery 16 with a larger capacity can be installed.

The motor unit, at a portion where the motor unit 30 and the pivot frame 124 overlap in the vehicle width direction, is disposed between the pivot frames 124L, 124R. Because the motor unit 30 is disposed between the pivot frames 124L, 124R, the motor unit 30 can be protected from flying objects such as flying stones.

Note that in the present embodiment, the motor unit 30, in a side view of the vehicle, is disposed overlapping the pivot frame 124. However, other configurations may be employed, including a configuration in which the motor unit 30 is disposed overlapping the backbone frame 123. Also, the motor unit 30, in a side view of the vehicle, may be disposed entirely overlapping the main frame 12, or may be disposed partially overlapping the main frame 12. An example of a configuration in which the motor unit 30 partially overlaps the main frame 12 includes a configuration in which the rear side of the motor unit 30 overlaps the main frame 12. Other examples include configurations in which the motor unit 30 is disposed with a front side, a central portion, an upper side, or a lower side overlapping the main frame 12.

Also, in the present embodiment, a cutout portion 127 is provided in the pivot frame 124L to avoid the case portion 32*a* projecting outward in the vehicle width direction from the motor housing portion 31*a*. In the present embodiment, the motor housing portion 31*a* of the motor unit 30 is disposed between the pivot frames 124. However, the drive sprocket 323 is provided on the outer side of the case portion 32*a* in the vehicle width direction, and the chain 23 is wound on the outer side of the pivot frame 124. Thus, a portion of the case portion 32*a* is provided projecting further outward in the vehicle width direction than the pivot frame 124. In a configuration provided with the cutout portion 127 in this manner, interference between the case portion 32*a* and the pivot frame 124L can be prevented and the motor unit 30 can be disposed more to the rear of the housing portion 10*a*. This allows more housing space for the battery 16 to be created.

Note that the cutout portion 127 may have a configuration in which the cutout portion 127 is formed so as to avoid the drive sprocket 323. In such a configuration, the motor housing portion 31*a* and the case portion 32*a* are disposed between the pivot frames 124, and the drive sprocket 323 is disposed outward from the pivot frame 124. Thus, only the drive sprocket 323 interferes with the pivot frame 124, and, because the interference region is small, the processing to form the cutout portion 127 can be made simple.

Also, in the present embodiment, the motor unit 30 is disposed with the motor shaft 311 located frontward from the pivot frame 124 in the front-and-rear direction. Because the motor shaft 311 projects outward from the motor housing portion 31*a* in the vehicle width direction, the motor shaft 311 is disposed frontward from the pivot frame 124. This can prevent interference between the projection portion of the motor unit 30 and the pivot frame 124. Thus, the motor unit 30 can be disposed between the pivot frames 124 with a simple configuration without the pivot frames 124 needing significant processing.

Furthermore, in the present embodiment, the motor shaft 311 and the output shaft 322 are coaxially disposed. Because the motor shaft 311 and the output shaft 322 are coaxially disposed, the shape of the case portion 32*a* projecting outward from the motor housing portion 31*a* in the vehicle width direction is made smaller in the vehicle longitudinal direction. Thus, the motor unit 30 can be easily contained within the pivot frames 124. Note that in the motor unit 30 of the present embodiment, the motor shaft 311 and the output shaft 322 are coaxially disposed. However, another configuration may be employed in which the motor shaft 311 and the output shaft 322 are not coaxially disposed.

Also, in the present embodiment, the output shaft 322 is located frontward from the pivot shaft 125, and an axle 29 of the rear wheel RW, the pivot shaft 125, and the output shaft 322 are disposed located on a single straight line (a two-dot chain line L). Because these are disposed on a single straight line, the distance between the pivot shaft 125 and the output shaft 322 can be shortened and the motor unit can be disposed more to the rear side. This allows more housing space for the battery 16 to be created in the portion on the front side of the housing portion 10*a*. Also, because the axle 29 of the rear wheel RW, the pivot shaft 125, and the output shaft 322 are disposed on a single straight line, the power transfer efficiency can be improved.

Furthermore, the motor unit 30, in a side view of the vehicle, is disposed with the oil pan 33 projecting downward from the pivot frame 124 and the down frame 13. In this way, traveling winds and the like easily come into contact with the oil pan 33, allowing the cooling efficiency of the oil to be improved. Here. FIG. 6 will also be referenced. A rib 38 is formed extending from a bottom surface of the oil pan 33 downward. Because the rib 38 is formed at a portion of the oil pan 33 that projects downward from the down frame 13, traveling winds can come into contact with the rib 38. This further improves the cooling efficiency of the oil.

Also, the motor unit 30, in a side view of the vehicle is disposed with the oil pump 34 disposed side by side the pivot frame 124 in the front-and-rear direction. In this way, the pivot frame 124 does not hinder maintenance work and maintainability can be improved.

In the present embodiment, the control unit 40 is disposed overlapping the pivot frame 124 upward from the motor unit 30 in a side view of the vehicle. Thus, more battery housing space can be created in the front-and-rear direction. Also, the control unit 40 is disposed between the pivot frames 124L, 124R in a region in which the control unit 40 overlaps the pivot frames 124 in a side view of the vehicle. In this way, the control unit 40 can be protected from flying objects such as flying stones.

Also, the control unit 40, in a side view of the vehicle, is disposed upward from and close to the motor unit 30. Because the motor unit 30 and the control unit 40 are disposed close to one another, the bus bar 42 connecting the motor unit 30 and the control unit 40 can be shortened. In the present embodiment, the bus bar 42 connects together a front surface of the motor unit 30 (the surface facing the vehicle left side when assembled) and a surface of the control unit 40 facing the vehicle left side. However, the configuration of the connection position of the bus bar 42 is not limited thereto. For example, the bus bar 42 may be shortened by connecting together an upper surface of the motor unit 30 and a lower surface of the control unit 40.

Inside the motor unit 30, a resolver 35 is provided that detects a rotation angle of the electric motor 31. Also, an upper portion of a vehicle-front facing surface of the motor unit 30 and a downward facing surface of the control unit 40 are connected via a wire harness 352 capable of transferring electric signals. An electric signal based on a detection result of the resolver 35 is transferred from the motor unit 30 to the control unit 40 via the wire harness 352. Because the wire harness 352 is provided on an upper portion of a vehicle front facing surface of the motor unit 30, the wire harness 352 can be disposed outside of an area in which the rear swing arm 19 can swing. Also, because the wire harness 352 connects to the upper portion of the motor unit 30, the wire harness 352 can be prevented from being submerged in water and the like.

In the present embodiment, the wire harness 352 is connected to the upper portion of the vehicle-front facing surface of the motor unit 30. However, the wire harness 352 may be connected to a, when assembled, vehicle-left-side facing surface, a vehicle-right-side facing surface, and the like. Also, an example of a configuration in which the wire harness 352 is disposed on the motor unit 30 side includes a configuration in which the wire harness 352 is disposed on the motor unit 30 frontward and upward from the motor shaft 311 when assembled. By the wire harness 352 being connected in this area, the area in which the rear swing arm 19 can swing can be avoided and the wire harness 352 being submerged in water and the like can be prevented.

Also, the motor unit 30 is disposed between the seat frames 14 in a top view of the vehicle. Because the motor unit 30 is disposed between the seat frames 14 in a top view of vehicle, interference between the motor unit 30 and the legs of an occupant, when the occupant grips with their legs, can be prevented.

Next, the attachment structure of the motor unit 30 will be described. The motor unit 30 is sandwiched between the pivot frames 124 at upper attachment portions 128 and lower attachment portions 129. In the present embodiment, the motor unit 30 includes through-holes 301 and 302 at positions corresponding to the upper attachment portions 128 and the lower attachment portions 129.

A fixing member 501 and a fixing member 502 that spans between the pivot frames 124L, 124R in the vehicle width direction is able to be attached to the upper attachment portions 128 and the lower attachment portions 129 respectively. The fixing member 501 is attached to the upper attachment portions 128 extending through the through-hole 301 to fix the motor unit 30 to the pivot frames 124. In a similar manner, at the lower attachment portions 129, the motor unit 30 is fixed to the pivot frames 124 via a fixing member 502. Note that configurations other than the configuration described above in which the motor unit 30 is sandwiched between the pivot frames 124 may be employed, including, for example, a configuration in which the motor unit 30 is fixed to the pivot frames 124L, 124R via bolt fastening or another attachment structure.

Also, the motor unit 30 is supported in a hanging manner by a left and right pair of brackets 133, which are plate-like metal members extending from the backbone frames 123L, 123R toward the motor unit. The motor unit 30 includes a through-hole 303 at a position corresponding to the brackets 133. A fixing member 503 is able to be attached to the brackets 133, the fixing member 503 spanning across the brackets 133 in the vehicle width direction. The motor unit 30 is supported by the brackets 133 in a hanging manner, with the fixing member 503 extending through the through-hole 303 and attached to the brackets 133. Note that configurations other than the configuration described above in which the motor unit 30 is supported in a hanging manner by the brackets 133 may be employed, including, for example, a configuration in which the motor unit 30 is fixed to the left and right brackets 133 via bolt fastening or another attachment structure. Also, the upper attachment portions 128 and lower attachment portions 129 are disposed on either side of the pivot shaft 125 in the vertical direction. Thus, by using the case rigidity of the motor unit 30, the support rigidity of the swing arm 19 can be improved and the weight of the pivot frame 124 can be reduced.

In the present embodiment, the brackets 133 are provided extending from the backbone frames 123L, 123R. However, another configuration may be employed in which the brackets, divided into left and right portions, extend from the head pipe 11. Also, instead of the brackets 133, a pipe-like metal member may extend from the head pipe 11 or the backbone frame 123 and support the motor unit 30 in a hanging manner.

Because the motor unit 30 is supported by the highly rigid vehicle body frame 10 in this manner at three points, the upper attachment portions 128, the lower attachment portions 129, and the brackets 133, the attachment rigidity of the motor unit 30 can be improved.

Also, in the present embodiment, the pivot shaft 125 is located rearward from the motor unit 30. However, another configuration may be employed in which the motor unit 30 is provided with the pivot shaft 125. An example of such as configuration includes a configuration in which a through-hole 302 is provided overlapping the pivot shaft 125 in a side view of the vehicle when assembled, and the motor unit 30 is supported by the pivot frame 124 with a shaft fixing member extending through the through-hole 302 and the rear swing arm 19 in the vehicle width direction. With this configuration, the motor unit 30 and the rear swing arm can be supported by the single fixing member 501, allowing the number of constituent components to be reduced.

Also, the control unit 40 at a portion overlapping with the pivot frame 124 in a side view of the vehicle is sandwiched between the pivot frames 124 via a non-illustrated fixing structure.

Next, the configuration of a cooling circuit of the present embodiment will be described with reference to FIGS. 1 and 2. The heat exchanger 24 according to the present embodiment is an oil cooler, and the cooling medium is an oil that also functions as a lubricant for the inner portion of the motor unit 30.

The cooling medium cooled at the heat exchanger 24 circulates to the oil pan 33 through the inside of a first tube shaped member 251. Here, the first tube shaped member 251 extends downward from the heat exchanger 24 along the down frame 13, then extends rearward and connects to the oil pan 33. The oil having been circulated through the inner portion of the motor unit 30 via the oil pump 34 is circulated to the heat exchanger 24 through the inner portion of a second tube shaped member 252. Here, the second tube shaped member 252 extends from the oil pan 33 along the down frame 13 and connects to the heat exchanger. In other words, the circulation path 25 includes the first tube shaped member 251, the motor unit inner portion, and the second tube shaped member 252. The oil, i.e., cooling medium, circulates through the circulation path 25 in order from the heat exchanger 24, the motor unit 30, and the heat exchanger 24.

Here, the heat exchanger 24 may be a radiator. In the case in which a radiator is employed, the inner portion of the motor unit 30 may be provided with a water jacket that allows cooling fluid (coolant) through, the cooling fluid passing through the inner portion thereof with this configuration, oil inside the motor unit 30 can be cooled.

OTHER EMBODIMENTS

Figure 7:
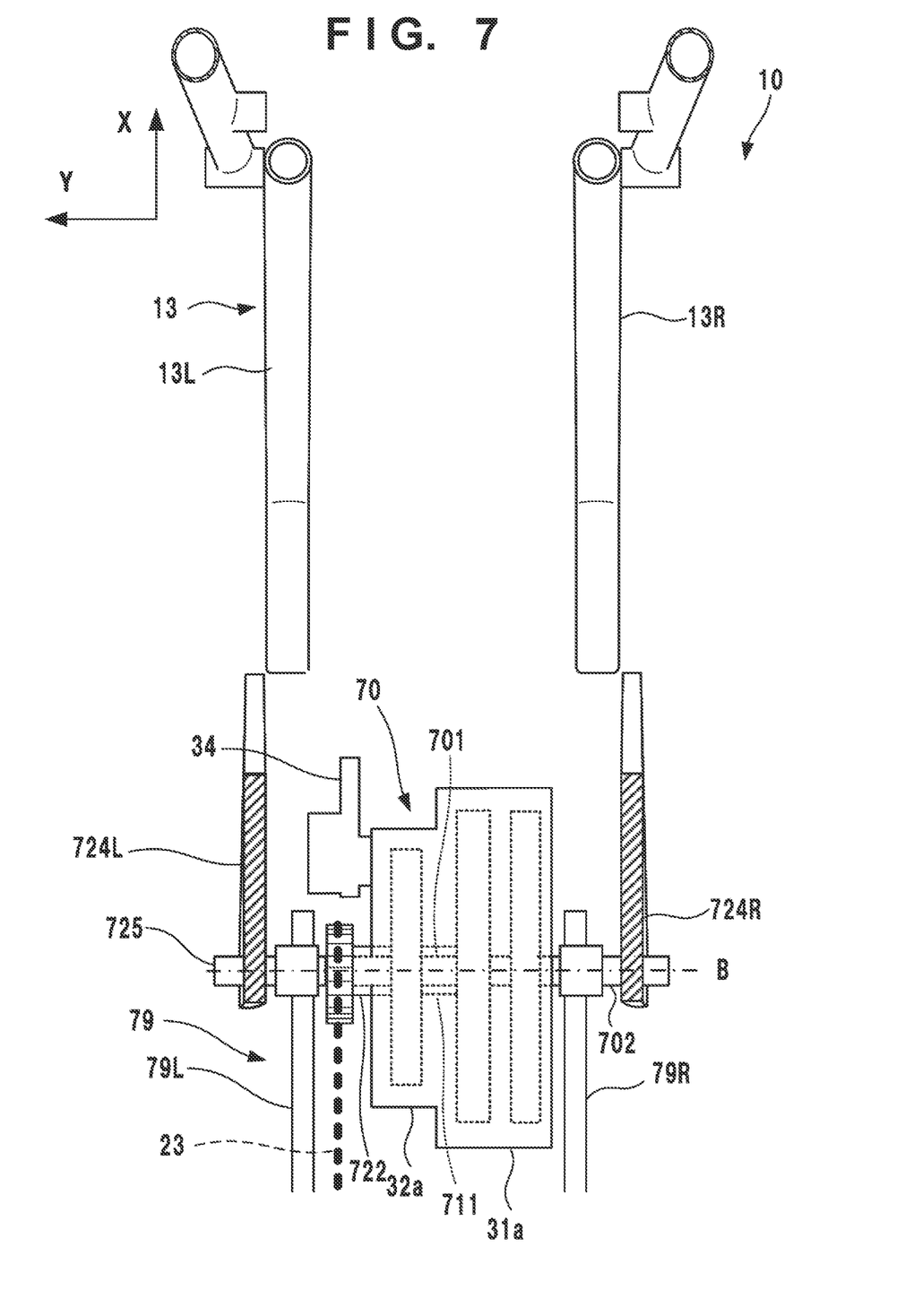
FIG. 7 is a cross-sectional view of a straddle type electric vehicle according to another embodiment taken along line II-II with some components omitted.

FIG. 7 is a cross-sectional view of the straddle type electric vehicle 1 according to another embodiment taken along line II-II with some components omitted. In the present embodiment, the positional relationship between the rear swing arm, the pivot frame, and the motor unit and the configuration of the motor unit are different from the embodiment described above. Hereinafter, components similar to that of the embodiment described above will be given the same reference signs and description thereof will be omitted.

In the present embodiment, a motor unit 70, in a top view of the vehicle, is disposed between a left and right pair of portions 79L, 79R of a rear swing arm 79. Also, the rear swing arm 79, in a top view of the vehicle, is disposed between a left and right pair of pivot frames 724L. 724R.

The motor unit 70 is disposed with a motor shaft 711 and an output shaft 722 coaxially disposed (on an axis line B of FIG. 7). Also, in an inner portion of the motor shaft 711 and the output shaft 722, a through-hole 701 is formed extending through the motor shaft 711 and the output shaft 722 in the vehicle width direction, and a shaft 702 is provided extending through the through-hole 701. The shaft 702 supports the motor unit 70 and swingably supports the rear swing arm 79 as a pivot shaft 725 of the rear swing arm 79. Also, the shaft 702 is supported by the pivot frames 724L, 724R outward from the rear swing arm 79 in the vehicle width direction.

According to such a configuration, the motor unit 70 can be disposed between the rear swing arms 79L, 79R without being sandwiched by the pivot frames 724. Thus, the space between the left and right portion of the rear swing arm 79 can be used as space to dispose the motor unit 70. Also, the rear swing arm 79 and the motor unit 70 are disposed between the pivot frames 724. This prevents interference in the vehicle longitudinal direction between the pivot frames 724 and the motor unit 70. Thus, because the motor unit 70 is disposed more to the rear, more housing space for the battery 16 can be created. Note that in the present embodiment, the rear side of the motor unit 70 is disposed between the pivot frames 724. However, another configuration may be employed in which the entire motor unit 70 is disposed between the pivot frames 724.

SUMMARY OF EMBODIMENTS

The embodiments described above disclose at least the following vehicle.

1. A straddle type electric vehicle according to the embodiment described above is a straddle type electric vehicle (for example, 1), including:

a front wheel (for example, FW) and a rear wheel (for example, RW);

a head pipe (for example, 11) that supports a steering mechanism for steering the front wheel:

a main frame (for example, 12) connected to the head pipe that extends in a vehicle longitudinal direction;

a motor unit (for example, 30) including an electric motor that outputs a driving force to rotate the rear wheel; and a battery (for example, 16) that supplies power to the motor unit, wherein the motor unit and the battery are supported by the main frame between the front wheel and the rear wheel;

the main frame includes a left and right pair of portions (for example, 12L, 12R); and at least a portion of the motor unit is disposed at a position overlapping the main frame in a side view of the vehicle.

According to this embodiment, the motor unit is disposed between the main frames, allowing the remaining space to be used as battery housing space. This can ensure more housing space for the battery. In this way, a straddle type electric vehicle in which more housing space for a battery can be ensured is provided.

2. In the straddle type electric vehicle of the embodiment described above, the left and right pair of portions of the main frame include a left and right pair of backbone frames (for example, 123L, 123R) extending in the vehicle longitudinal direction and a left and right pair of pivot frames (for example, 124L, 124R) extending in a vertical direction from rear end portions of the backbone frames;

at least a portion of the motor unit is disposed between the left and right pair of pivot frames;

the pivot frames include a pivot shaft (for example, 125) that swingably supports a rear swing arm (for example, 19), the rear swing arm rotatably supporting the rear wheel; and in the vehicle longitudinal direction, a motor shaft (for example, 311) of the electric motor is located forward from the pivot frames.

According to this embodiment, the motor shaft is disposed frontward from the pivot frame. This can prevent interference between the projection portion of the motor unit and the pivot frame. Thus, the motor unit can be disposed between the pivot frames with a simple configuration without the pivot frames needing significant processing.

3. In the straddle type electric vehicle of the embodiment described above,
in a side view of the vehicle, an axle (for example, 29) of the rear wheel, the pivot shaft, and an output shaft of the motor unit are provided on a single straight line.

According to this embodiment, the axle of the rear wheel, the pivot shaft, and the output shaft are disposed on a single straight line. Thus, the distance between the pivot shaft and the output shaft can be shortened and power transfer efficiency can be improved.

4. In the straddle type electric vehicle of the embodiment described above,
the motor unit includes a deceleration portion (for example, 32) including a planetary gear (for example, 32b) for decelerating rotational driving force output from the motor shaft and the output shaft for outputting rotational driving force decelerated by the planetary gear; and
the motor unit and the output shaft are coaxially disposed.

According to this embodiment, the motor shaft and the output shaft are coaxially disposed. Thus, the region in which the deceleration portion projects outward in the vehicle width direction past the electric motor when assembled is shortened in the vehicle longitudinal direction. Thus, the region in which the motor unit and the pivot frame overlap can be increased, and more housing space for the battery can be created.

5. In the straddle type electric vehicle of the embodiment described above, the motor unit includes
a first housing portion (for example, 31a) that houses the electric motor, and
a second housing portion (for example, 32a) projecting from the first housing portion in a vehicle width direction that houses the planetary gear; and
the pivot frame, in a side view of the vehicle, is provided with a cutout portion (for example, 127) to avoid overlapping the second housing portion.

According to this embodiment, the cutout portion is provided to avoid the second housing portion. This allows the motor unit to be disposed more to the rear in the vehicle longitudinal direction. Thus, more battery housing space for the battery can be created.

6. The straddle type electric vehicle of the embodiment described above further includes
a control unit (for example, 40) that executes drive control of the motor unit, wherein
the control unit is provided upward from the motor unit; and
in a top view of the vehicle, at least a portion of the control unit is disposed between the left and right pair of pivot frames.

According to this embodiment, the motor unit and the control unit are disposed close to one another. This allows the connection portion therefor to be shortened. Also, the control unit is disposed between the pivot frames. This protects the control unit from external disturbances such as collisions from flying objects.

7. In the straddle type electric vehicle of the embodiment described above, an oil pan (for example, 33) is provided on a lower portion of the motor unit; and
a lower end of the oil pan is located downward from the pivot frames.

According to this embodiment, the oil pan projects downward from the pivot frame. Thus, the oil pan can easily come into contact with traveling winds, allowing the oil to be efficiently cooled.

8. In the straddle type electric vehicle of the embodiment described above, the motor unit is provided with an oil pump (for example, 34); and
the oil pump is disposed side by side the pivot frames in the vehicle longitudinal direction.

According to this embodiment, the oil pump is disposed not overlapping the pivot frame. This can improve maintainability. Also, traveling winds can come into contact with the oil pump directly. This can improve cooling efficiency.

9. The straddle type electric vehicle of the embodiment described above further includes
a left and right pair of seat frames (for example, 14) extending rearward from the left and right pair of backbone frames in the vehicle longitudinal direction, wherein
in a top view of the vehicle, the motor unit is disposed between the left and right pair of seat frames.

According to this embodiment, the motor unit is disposed between the seat frames in a top view of vehicle. Thus, interference between the motor unit and the legs of an occupant, when the occupant grips with their legs, can be prevented.

10. In the straddle type electric vehicle of the embodiment described above, the rear swing arm includes a left and right pair of portions:
in a top view of the vehicle, the motor unit is disposed between the left and right pair of portions of the rear swing arm; and
in a top view of the vehicle, the rear swing arm is disposed between the left and right pair of pivot frames.

According to this embodiment, the space inside the rear swing arm can be used to dispose the motor unit in. This can ensure more housing space for the battery.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A straddle electric vehicle comprising:
a front wheel and a rear wheel;
a head pipe that supports a steering mechanism for steering the front wheel;
a main frame connected to the head pipe that extends in a vehicle longitudinal direction;
a motor unit including an electric motor that outputs a driving force to rotate the rear wheel;
a battery that supplies power to the motor unit; and
a control unit that executes drive control of the motor unit, wherein the motor unit and the battery are supported by the main frame between the front wheel and the rear wheel;
the main frame includes a left and right pair of portions;
the left and right pair of portions include a left and right pair of pivot frames extending in a vertical direction;
at least a portion of the motor unit and at least a portion of the control unit are disposed at a position overlapping the pivot frame in a side view of the vehicle;
the motor unit includes a motor housing portion that houses the electric motor;
the control unit is provided upward and apart from the motor housing portion; and a motor shaft of the electric motor is located forward from the pivot frames.

2. The straddle electric vehicle according to claim 1,
wherein the left and right pair of portions of the main frame include a left and right pair of backbone frames extending in the vehicle longitudinal direction;
the left and right pair of pivot frames extends in a vertical direction from rear end portions of the backbone frames,
wherein at least a portion of the motor unit is disposed between the left and right pair of pivot frames, and
wherein the pivot frames include a pivot shaft that swingably supports a rear swing arm, the rear swing arm rotatably supporting the rear wheel.

3. The straddle electric vehicle according to claim 2,
wherein in a side view of the vehicle, an axle of the rear wheel, the pivot shaft, and an output shaft of the motor unit are provided on a single straight line.

4. The straddle electric vehicle according to claim 3,
wherein the motor unit includes a deceleration portion including a planetary gear for decelerating rotational driving force output from the motor shaft and the output shaft for outputting rotational driving force decelerated by the planetary gear, and
wherein the motor unit and the output shaft are coaxially disposed.

5. The straddle electric vehicle according to claim 4,
wherein the motor housing portion comprises a first housing portion, and the motor unit further includes a second housing portion projecting from the first housing portion in a vehicle width direction that houses the planetary gear, and
wherein the pivot frame, in a side view of the vehicle, is provided with a cutout portion to avoid overlapping the second housing portion.

6. The straddle electric vehicle according to claim 2,
wherein in a top view of the vehicle, at least a portion of the control unit is disposed between the left and right pair of pivot frames.

7. The straddle electric vehicle according to claim 2,
wherein an oil pan is provided on a lower portion of the motor unit, and
wherein a lower end of the oil pan is located downward from the pivot frames.

8. The straddle electric vehicle according to claim 7,
wherein the motor unit is provided with an oil pump, and
wherein the oil pump is disposed side by side the pivot frames in the vehicle longitudinal direction.

9. The straddle electric vehicle according to claim 2, further comprising a left and right pair of seat frames extending rearward from the left and right pair of backbone frames in the vehicle longitudinal direction,
wherein in a top view of the vehicle, the motor unit is disposed between the left and right pair of seat frames.

10. The straddle electric vehicle according to claim 2,
wherein the rear swing arm includes a left and right pair of portions,
wherein in a top view of the vehicle, the motor unit is disposed between the left and right pair of portions of the rear swing arm, and
wherein in a top view of the vehicle, the rear swing arm is disposed between the left and right pair of pivot frames.

* * * * *